S. Chapman, Jr.,
Sawing Stone.
N° 10,281. Patented Nov. 29, 1853.
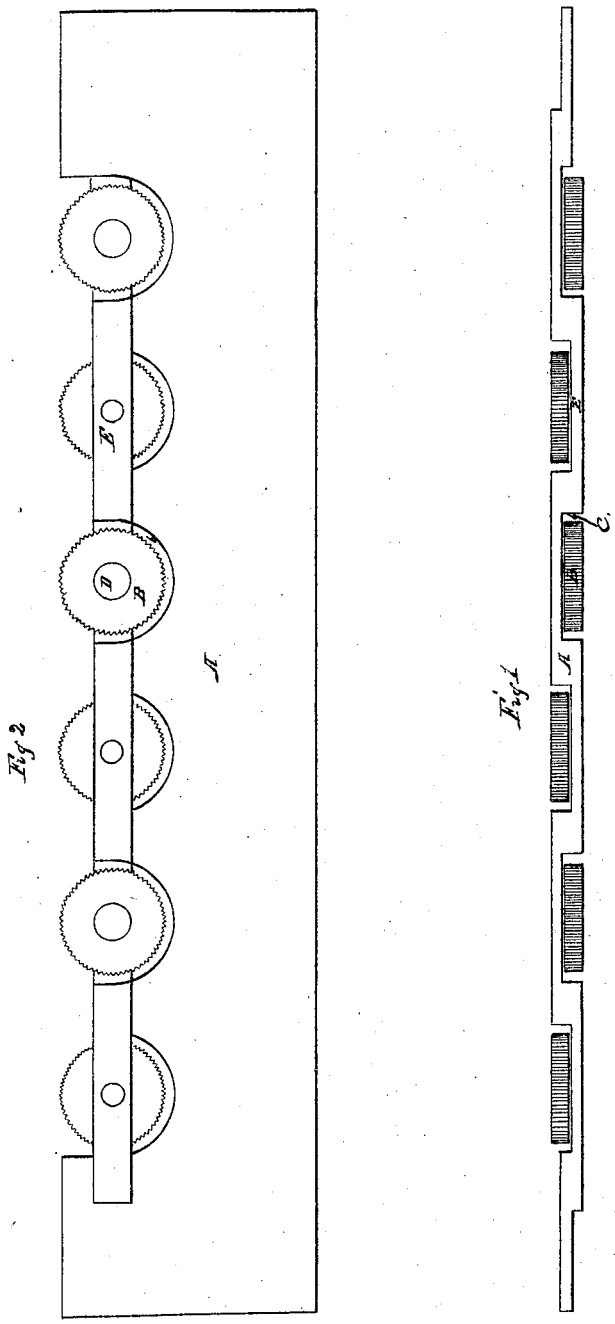

UNITED STATES PATENT OFFICE.

SAML. CHAPMAN, JR., OF NEW YORK, N. Y.

STONE-SAW.

Specification of Letters Patent No. 10,281, dated November 29, 1853.

*To all whom it may concern:*

Be it known that I, SAMUEL CHAPMAN, Jr., of the city, county, and State of New York, have invented a new and Improved Mode of or Machine for Sawing Stone; and I do hereby declare that the following is a full and exact description thereof, reference being had to the accompanying drawings and to the letters of reference marked thereon.

The nature of my invention consists in the application, adaptation, and arranging, a series of circular saws, attached in alternate countersinks or perforations to the sides, near the edge of a straight, or the periphery, of a circular, driving plate, in such a manner as to cut an entire kerf, of sufficient width to allow the combination of saws and their fastenings, to pass through in like manner, as a saw of ordinary construction, changing by this combined arrangement, the cut or working effect of the teeth from, the ordinary drawing cut, parallel with the line of motion, to the effect or cut of the edge of a chisel or drill driven from and nearly perpendicular thereto, pressed unto and penetrating the stone, in direction, and by force and leverage resulting from motion, consequent upon this combined arrangement.

The following description and accompanying drawings (Figure 1 a plan or bird's-eye view of the forward edge in line of motion and Fig. 2 a side view), is to enable others to make and use my invention.

I first construct of suitable material and desired dimensions and form, straight or circular, a driving plate, similar, when the saws are to be set in perforations, to an ordinary saw, without teeth as represented in the drawings, by the letter A. Then, relative to material and dimension, I in like manner construct the saws B, in all cases circular and usually from two to six inches in diameter, the thickness to be full or more than equal to one half the thickness of the whole combination, or width of kerf desired to be cut, then from the edge or periphery of the driving plate I cut a circular portion C, sufficiently exceeding the diameter of the saws, to allow their free rotation upon their axis, and discharge of dust. I then by means of screws or other fastenings attach the saws to their journals D, which I affix to the journal plate E, which by rivets or screws I secure or fasten to the driving plate, diametrically across the perforations, placing the axis of the saws, so near the opening of the perforation, as to cause their peripheries or teeth, to protrude sufficiently beyond the forward edge or line of motion of the driving plate, to cause their free contact with the stone, by which with their projectile force from the driving plate, the rotation upon their axis is caused and the working or cutting effect as above described produced.

If the countersinking be preferred to perforation then a portion of the edge or rim of the driving plate should be of sufficient thickness to render one half of the same strong enough to sustain the journals of the saws. This mode will be preferable when it is desirable to diminish the necessary width of kerf, inasmuch as a great portion of the thickness of the driving plate may be abated, it being only necessary to sink the inner sides of the opposite saws to the same line or center of the kerf, in this mode of structure, the driving plate journal and journal plate requisite in the first described mode may be composed of one and the same piece of material. The combination thus arranged is to be supplied with arbors, fastenings, appendages, machinery and power, as other saws, and used for the purpose of common stone sawing, or as I have also contemplated its use in connection with appropriate machinery for the purpose of quarrying and tunneling.

What I claim as my invention or discovery and desire to secure by Letters Patent, is,

The application, adaptation, and arranging, as above described or in similar manner a series of circular saws whereby I obtain from this combination of parts and motions the desired or above described mode and effect of sawing or severing stone.

SAMUEL CHAPMAN, JR.

Signed in presence of—
SIDNEY KETCHUM,
GEORGE BRAINERD.